United States Patent [19]

Heraud

[11] Patent Number: 5,156,337
[45] Date of Patent: Oct. 20, 1992

[54] FLEXIBLE AND PRESSURE-PERMEABLE HEAT PROTECTION DEVICE

[75] Inventor: Joël Heraud, Saint Aubin Du Medoc, France

[73] Assignee: Societe Nationale Industrielle et Aerospatiale, Paris, France

[21] Appl. No.: 652,721

[22] Filed: Feb. 8, 1991

[30] Foreign Application Priority Data

Feb. 9, 1990 [FR] France ................ 90 01556

[51] Int. Cl.⁵ .............................. B64C 15/02
[52] U.S. Cl. ................. 239/265.35; 239/265.11
[58] Field of Search ......... 239/265.11, 265.19, 239/265.33, 265.35; 60/271; 428/920; 244/53 R

[56] References Cited

U.S. PATENT DOCUMENTS

| 3,507,148 | 4/1970 | Wright et al. | 239/265.11 X |
|---|---|---|---|
| 3,726,480 | 4/1973 | Miltenberger | 239/265.19 |
| 3,759,446 | 9/1973 | Bligh et al. | 239/265.35 |
| 4,093,157 | 6/1978 | Cavanagh, Jr. et al. | 244/53 R |
| 4,098,076 | 7/1978 | Young et al. | 239/265.19 X |
| 4,110,972 | 9/1978 | Young et al. | 239/265.19 X |
| 4,477,025 | 10/1984 | Calabro et al. | 239/265.35 |
| 4,525,999 | 7/1985 | Inman | 239/265.19 X |
| 4,649,701 | 3/1987 | Wendel | 239/265.43 X |
| 4,666,084 | 5/1987 | Mitchell et al. | 239/265.19 X |
| 4,811,529 | 3/1989 | Harris et al. | 428/920 X |
| 4,917,302 | 4/1990 | Steinetz et al. | 239/265.4 |
| 5,014,917 | 5/1991 | Sirocky et al. | 239/265.11 |

FOREIGN PATENT DOCUMENTS 2422831 11/1979 France .
2457390 12/1980 France .
2489812 3/1982 France .

Primary Examiner—Andres Kashnikow
Assistant Examiner—William Grant
Attorney, Agent, or Firm—Nikaido, Marmelstein, Murray & Oram

[57] ABSTRACT

The invention relates to a heat protection device between a first and a second zone. The second zone can be subjected to relatively sudden and large variations of temperature and pressure. The device includes a screen disposed between the two zones. According to the invention, the screen is thermally insulating. At least a part of the screen is constructed of a material which is pressure-permeable and flexible.

24 Claims, 4 Drawing Sheets

FLEXIBLE AND PRESSURE-PERMEABLE HEAT PROTECTION DEVICE

FIELD OF THE INVENTION

The invention relates to heat protection devices intended for zones which are to undergo, during a relatively short time, a relatively high heat flux as well as a sudden variation of pressure. The invention further relates to materials permitting the construction of these devices.

The invention is, in particular, applicable to the heat protection of elements subjected to the heat fluxes emitted by generators of hot gases, and more particularly to the heat protection of the case of the propulsion unit of a rocket or of a missile. Such a protection permits the protection of the electrical, mechanical or other systems which are situated within the rear zones of the propulsion units, from the heat fluxes emitted by the nozzles, in the course of the firing and/or of the launch of missiles or of rockets and/or of the separation of two of their stages.

BACKGROUND OF THE INVENTION

It is known that such nozzles may be fixed or may exhibit a very low deformability but that, for certain applications, requiring, for example, orientable nozzles, their movements may be relatively great. A nozzle exhibits, in general, a substantially frustoconical form. At rest, the nozzle is in a position such that its axis is substantially parallel to the axis of the propulsion unit. The movements of the nozzle consist principally of an inclination of its axis in relation to the axis of the propulsion unit. The nozzle may likewise become deformed slightly under the effect of the hot gases which circulate therein. The invention relates to a heat protection which can be used irrespective of the magnitude of the deformations or displacements of the nozzle.

It is further known that a rocket, just like a missile, is capable of being loaded on board an aircraft, a ship or a submarine. In such vehicles, the available space is measured and it is desired to have available the maximum of elements loaded in the minimum of space, without adversely affecting their integrity and without nevertheless impairing their effectiveness. Accordingly, it is beneficial to have an on-board projectile, rocket or missile, which has a particularly small length while still being capable of accomplishing the contemplated mission, with increased performance levels, for the same overall length of the projectile in the active phase. This result may be obtained by equipping the propulsion unit of the on-board projectile with a nozzle comprising an unfoldable divergent section. The divergent section is unfolded after the ignition of the propulsion unit when the projectile is in free flight and is no longer subject to limitations of length, in order to contribute to increasing the pressure reduction ratio of the gases in the nozzle and thus to improve the propulsion yield.

It is thus possible to refer to French Patent No. 2,422,831, which relates to a propulsion unit nozzle with an unfoldable divergent section, the divergent section being constituted by a succession of rigid rings connected to one another and to the nozzle body by flexible rings. In the folded position of the divergent section, these flexible and rigid rings are juxtaposed about one another and about the nozzle body according to an accordion profile. In the unfolded position of the divergent section, they are aligned one behind the other according to the profile desired for the divergent section in the active configuration.

It is likewise possible to refer to French Patent No. 2,457,390, which likewise relates to an unfoldable divergent section of a nozzle for a rocket propulsion unit. This divergent section comprises a set of elemental individual panels of refractory material which are articulated to one another and in relation to a divergent section fixed upstream part close to the neck of the nozzle. The articulated panels are distributed in such a manner as to define at least two crowns or frusta of a cone which are adjacent and successive and to be able to be placed in a first, folded position and in a second, unfolded position.

More specifically, the invention relates to a heat protection which is capable of being constructed both for nozzles constructed in one single piece and for nozzles which are at least partially unfoldable or comprise a divergent section which is at least partially unfoldable.

Numerous heat protection devices are already known, some of these being intended more particularly for the elements placed to the rear of the propulsion units. They may consist of an individual protection of each element which it is desired to protect from the heat fluxes emanating from the nozzle.

Thus, each structural element, for example the skirt or the base of the propulsion unit, as well as each system placed within the rear zone of the propulsion unit, may be equipped with a rigid insulating shell protecting it from the heat flux.

The patent FR-2,489,812 describes a method for the production of shaped parts which are capable of withstanding relatively great thermal shocks as well as high temperatures, in the order of 1600° C. These parts are constructed from a substrate formed of inorganic fibers rigidified by at least one inorganic binder and possibly an organic binder, the substrate being constructed by the technique of suction molding and the whole having undergone a treatment of reinforcement by a resin. The shaped parts which are obtained are resistant to delamination and to bursting under the effect of an excess pressure or of a reduced pressure of the gas and furthermore exhibit a good actual mechanical stability and an excellent machinability.

This technique of individual protection of each structural element and of each system exhibits numerous disadvantages.

First of all, it requires the use of a surface and thus of a mass of heat protection material which are very great.

Furthermore, these protective parts or shells are fixed mechanically or by adhesive bonding onto each structural element or each system. This means that only the characteristics of thermal insulation of the materials making up these shells or these parts are used. Furthermore, the adhesive bonding of the heat protection elements on the systems gives rise to numerous difficulties in the course of the maintenance of these systems. In fact, after the demounting of the systems, it is necessary in particular to undertake the removal of the protections and the descaling of the adhesive bonding surfaces.

Although the complexity of the construction of the protective parts is a function of the technique employed, it is nevertheless true that a specific tooling is necessary for the construction of each protective part intended for a particular structural element or system. Thus, the method described in the patent FR-2,489,812 requires the prior construction, for each particular protective part, of an suction mold intended to form this part.

Finally, it is found that these individual techniques of heat protection require numerous manual operations, especially operations of molding, cutting out, adjustment or again of adhesive bonding. Thus, these techniques are relatively costly.

Accordingly, it is then possible to contemplate a heat protection permitting the global protection of a first zone from the heat fluxes emanating from a second zone, which may be subjected to sudden and large variations of temperature and of pressure.

Thus, the patent U.S. Pat. No. 4,324,167 describes a device providing, between the ignition and the launch of a rocket, a seal between the launcher tube and the rear of the rocket. This device thus protects the launcher tube from the high-temperature gases which are generated by the rocket as soon as it has been ignited. This protection comprises a support screen and a flexible protection which are superposed, placed at the lower part of the rocket. In the course of the ignition of the rocket, a pressure is exerted against the flexible protection, which is deformed in order to come into contact with the rocket and to form a seal. When the rocket takes off, it fractures the seal, the exhaust gases escaping from the nozzle, then causing the deformation of the protection and the increasing of the gas flux through the latter.

This heat protection is effective to protect the launcher tube in which a missile or a rocket is placed from the heat fluxes emitted by the nozzles. However, this protection has no effect on the systems placed within the rear zones of the propulsion unit.

It is, however, possible to contemplate heat insulation by virtue of a heat screen ensuring a global heat protection of either an entire zone comprising systems or a fraction of this zone corresponding to a particular system which is sensitive to the heat flux.

A global heat protection has advantages. In fact, its construction requires less mold and tooling than the technique of individual heat protection. Accordingly, it is less costly than the latter. Furthermore, access to these systems which it protects is easier and their maintenance is facilitated thereby. In particular, the operations of descaling of the systems in order to remove the residues of adhesive and of insulating material, resulting from the adhesive bonding of the heat protection parts on the systems, are eliminated. Finally, the surface and thus the mass of the heat protection materials required for the construction of such a global heat protection are far smaller than those involved in the construction of individual heat protection parts which would be required to protect the same systems. It can be found that the mass gain is 25 to 30%.

The global heat protection as described in the patent U.S. Pat. No. 4,324,167 does, however, exhibit disadvantages. Thus, it is found that it is pressure-sealed. Consequently, it gives rise to large stresses on the carrying structures to which it is fixed. This demands the reinforcement of these carrying structures and thus involves an increase in their mass, thereby reducing the performances of the projectile on which the heat protection is constructed.

Heat protections are known which are rigid and pressure-permeable. However, these exhibit only a relatively poor mechanical stability. Reference may be made, once again, to the patent FR-2,489,812, which describes heat protection parts and materials exhibiting a relatively high porosity and which thus resist bursting under the effects of excess pressures or of reduced pressures of gases. However, these parts or materials do not exhibit any good mechanical characteristics and require carrying structures such as frames. This involves an increase in the mass of the heat protection constructed; as previously, this reduces the performances of the projectile on which the heat protection is mounted.

Finally, such heat protections are used for nozzles which are fixed or which exhibit a very low deformability, but cannot be used for nozzles, the movements of which are relatively large.

Accordingly, it is possible to contemplate a rigid device for heat protection of elements subjected to the heat fluxes emitted by hot-gas generators, which is permeable to the excess pressures created by the ignition of the generators in order to limit the stresses on the carrying structures permitting the withstanding of high heat fluxes and adaptation to large deformations of these generators. In the case where the hot-gas generator is constituted by the nozzle of a rocket or missile propulsion unit, this device may, for example, consist of a heat screen composed of two self-supporting and non-integral parts, one part being fixed to the nozzle and the other part to the skirt of the propulsion unit. A baffle being formed between these two parts, the screen is permeable to the pressure while ensuring an effective protection of a first zone at the rear of the propulsion unit, which zone is situated between the case of the propulsion unit and the protection device, in relation to a second zone situated between the protection device and the ambient environment.

However, such a heat protection device cannot be used for nozzles comprising a divergent section which is at least partially unfoldable.

This device also exhibits disadvantages. In fact, each part making up the screen can be constructed of a material which is either sealed or pressure-permeable.

In the first case, large stresses are exerted on the structures to which it is fixed; this requires the placing of reinforcements in position. In the second case, the material does not exhibit adequate mechanical stability and it is necessary to provide carrying structures. Accordingly, it is found that, in both cases, the mass of the heat protection device is necessarily increased; this reduces the performances of the projectile on which it is mounted.

SUMMARY OF THE INVENTION

Accordingly, the subject of the invention is a heat protection device:
  permeable to the excess pressures caused by the ignition of a nozzle,
  of reduced mass,
  permitting the withstanding of high heat fluxes,
  exhibiting a storage capacity compatible with a nozzle comprising a divergent section which is at least partially unfoldable and
  capable of adapting to large displacements and/or deformations of the nozzle.

This protection device is more particularly applicable to the heat protection of the case of a missile or rocket propulsion unit. It is permeable to the excess pressures caused by the ignition of the nozzle or nozzles, withstands high temperatures, exhibits a storage capacity compatible with at least one nozzle comprising a divergent section which is at least partially unfoldable and can adapt to large deformations and/or displacements of the nozzle or nozzles.

Accordingly, the subject of the invention is a device for heat protection between a first and a second zone, it being possible for the second zone to be subjected to relatively sudden and large variations of temperature and of pressure, this device comprising a screen disposed between the two zones.

According to the invention, the screen being thermally insulating, at least a part of the screen is constructed of a material which is pressure-permeable and flexible.

Preferably, the zones being situated between at least one first and one second element, which elements are substantially opposite and capable of moving away from one another and of sliding relative to one another, the screen exhibits at least one point of fastening on each one of the elements.

Preferably, the screen exhibits a form which is adapted to the first and second elements.

In an application of the device according to the invention, the second zone is subjected to the temperature and to the pressure of gases emanating from a generator of relatively hot gases.

The first element is then constituted by the hot-gas generator.

In a more particular application, the zones are situated to the rear of the propulsion unit of a rocket or of a missile.

The hot-gas generator is then constituted by the propulsion unit and the nozzle of the rocket or of the missile, while the second element is constituted by the skirt of the rocket or of the missile.

In this application, the first zone is further situated between the case of the propulsion unit and the screen, while the second zone is further situated between the screen and the ambient environment.

According to a preferred embodiment of the heat protection device according to the invention, the screen is substantially annular, its external periphery constituting a zone of fastening on the skirt, while its internal periphery constitutes a zone of fastening on the nozzle.

Preferably, the part constructed of flexible material is fixed on the nozzle at the location of its internal periphery.

According to a first embodiment of the heat protection device according to the invention, the screen further comprises another part, the external periphery of which is fixed on the skirt.

In a first illustrative embodiment, this other part is constituted by a material which is thermally insulating and rigid.

In a second illustrative embodiment, this other part is constituted by a thermally insulating material, and by a carrying structure.

In these two examples, the thermally insulating material is, preferably, pressure-permeable.

In the second illustrative embodiment, the carrying structure is supported, preferably, by a frame.

Preferably, the frame is composed of arms distributed about the nozzle and connected to one another via an upper frame member and a lower frame member, the upper frame member being fixed to the skirt, while the lower frame member supports the carrying structure.

In this second illustrative embodiment, the carrying structure is constituted by machined or molded supports or by a honeycomb conical plate.

In this case, the plate preferably comprises openings.

In these two illustrative embodiments, the part constructed of flexible material is preferably fixed to the lower frame member at the location of its external periphery.

According to a second embodiment of the heat protection device according to the invention, the part constructed of flexible material constitutes the entire screen and is fixed near its external periphery on the skirt.

Preferably, the part constructed of flexible material is likewise fixed on the lower frame member of a frame.

In order to facilitate its mounting on the nozzle, the screen is preferably composed of two annular elements which are connected to one another in the course of their mounting.

The subject of the invention is also a heat protection material which is pressure-permeable and flexible.

According to the invention, it comprises at least one layer of thermally insulating felt in refractory fibers, which is placed between at least two layers of fabric, at least one of which is constructed in a flame-retardant and/or refractory fabric.

In a first illustrative embodiment, the layers of felt and of fabric are juxtaposed.

In a second illustrative embodiment, the layers of felt and of fabric are retained in relation to one another by any appropriate linkage means such as sewings, staples or back or lock stitches.

Preferably, the linkage means are disposed along at least one direction in such a manner as to obtain a cushioning.

The linkage means may in particular be along two perpendicular directions.

In a first embodiment, the fabric is constituted by fibers identical with those making up the insulating felt.

In a second embodiment, the fabric is constituted by fibers of a nature different from that making up the insulating felt.

The pressure-permeable and flexible heat protection material according to the invention may also be constituted by a flexible metallic lattice or fabric covered with refractory fabrics or fibers.

BRIEF DESCRIPTION OF THE DRAWINGS

The invention will be better understood and further objects, advantages and features thereof will become more clearly evident upon reading the description, which follows, of particular embodiments, which description is given with reference to the accompanying drawings, in which.

The elements which are common to the various figures will be designated by the same references.

DESCRIPTION OF THE PREFERRED EMBODIMENTS

Figure 1:
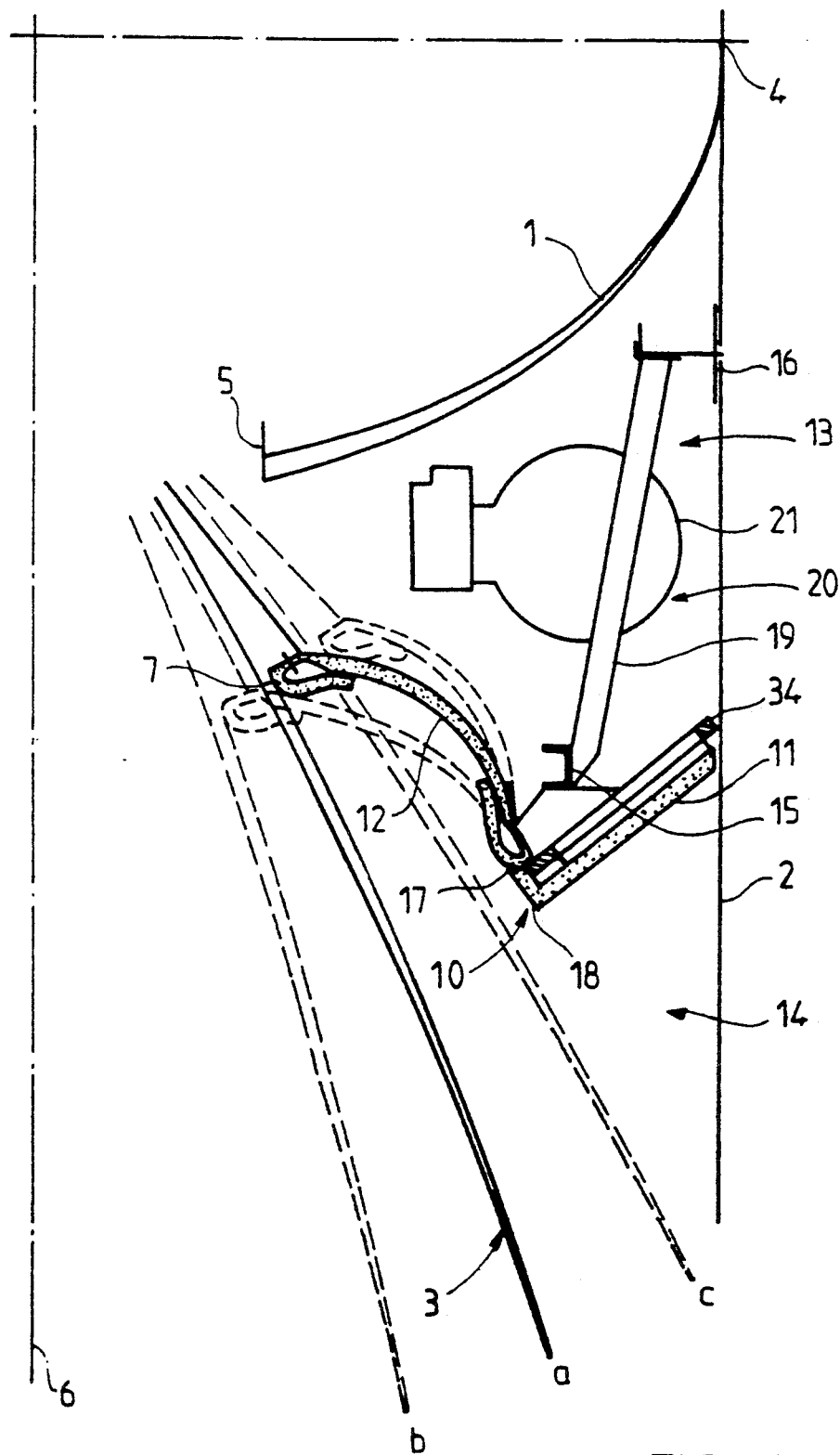
FIG. 1 represents a half-section of the rear zone of the propulsion unit of a rocket according to the vertical axis of the rocket.

With reference to FIG. 1, the case of the propulsion unit bears the reference numeral 1. It exhibits a concave annular form, the concavity of which is turned towards the interior of the propulsion unit. Near its external periphery 4, there is fixed the upper end of the skirt 2 which exhibits a cylindrical form. The case 1 and the skirt 2 are surfaces of revolution having as their axis the vertical axis 6 of the rocket. The upper end of the nozzle 3 is disposed near the internal periphery 5 of the case 1.

The nozzle 3 exhibits a substantially frustoconical form.

The skirt 2 is fixed, while on the other hand the nozzle is movable. Thus, FIG. 1 illustrates by way of example the two extreme positions of the nozzle, which are referenced b and c.

In the position a, which is shown in solid lines, the axis of the nozzle corresponds to the vertical axis 6 of the rocket. In the positions b and c, which are shown in broken lines, the axis of the nozzle forms an angle ±α in relation to the axis 6, α being a specified value.

As will be understood hereinbelow, the invention is more particularly advantageous for rockets comprising movable nozzles or nozzles comprising a divergent section which is at least partially unfoldable. However, it is entirely applicable to rockets, the nozzles of which are fixed.

It can be noted, moreover, that, irrespective of the type of nozzle, under the effect of the hot gases circulating in the nozzle the latter may expand slightly.

Between the nozzle 3 and the skirt 2 there are disposed electrical or mechanical systems, which are designated by the reference numeral 21. In the absence of any protection device, these systems are subjected to the heat flux emitted by the nozzle 3, in which hot gases circulate after the ignition of the rocket. The temperature of the gases may reach, for example, 1600° C.

The systems cannot undergo such temperatures without damage.

Accordingly, the object of the protection device according to the invention is to oppose the heat flux emitted by the nozzle, in order to limit the rise in temperature of the systems and of the structures to an acceptable value, for example within the range between 70° C. and 150° C.

This device essentially comprises a heat screen 10, which is constructed in a first part 11 and a second part 12, which parts are substantially annular. The first part 11 is mounted on the skirt 2 near its external periphery 18 via a frame 34 which is supported by the skirt 2, while the internal periphery 7 of the second part 12 is supported by the nozzle 3.

Furthermore, the first part 11, or the second part 12 respectively, is fixed near its external periphery 17, or near its external periphery 18 respectively, on the lower frame member 15 of a frame 20. The frame 20 is composed of a plurality of arms 19 distributed about the nozzle 3, which arms are connected to one another via an upper frame member 16, which is fixed to the skirt 2, and the lower frame member 15.

The frame 20 is essentially provided to carry systems, and it may also be used for the fixing of the heat screen. However, other fixing means may be provided.

In the illustrative embodiment illustrated by FIG. 1, the second part 12 of the protection device is placed closer to the case 1 of the propulsion unit than the first part 11. The benefit of this arrangement is detailed hereinbelow.

The two parts are constructed of materials such that they ensure an effective thermal insulation of a first zone 13 of the rear of the propulsion unit, which zone is situated between the case 1 of the propulsion unit and the protection device and comprises the systems 21 to be protected, in relation to a second zone 14 situated between the protection device and the ambient environment, while at the same time exhibiting a mechanical stability and a gas permeability which are sufficient.

In fact, the temperature of the gases emanating from the nozzle may reach high values, for example 1600° C.

Furthermore, the very sudden variations of the pressure within the second zone 14, on account of the gases emanating from the nozzle, may be likened to shocks and the transport as well as the firing of the projectiles on which the heat protection device may be fitted give rise to large vibrations.

Finally, the very sudden variations of pressure in the second zone 14 give rise to stresses on the carrying structures of the protection device which are the greater, the less pressure-permeable is the protection device. These stresses make it necessary to provide supplementary reinforcements in order that they should be supported without damage. This involves an increase in the overall mass of the protection device and therefore reduces the performances of the projectile on which the latter is mounted. It is therefore necessary to use materials which are relatively pressure-permeable.

The first part 11 may be constructed of a thermally insulating material in the case where the latter is sufficiently rigid. It is possible to cite by way of a non-limiting example of such a material the material marketed under the trade mark DURESTOS, which is composed of short fibers of asbestos and of thermosetting resin. It may also be constituted of a relatively rigid carrying structure covered with a thermally insulating material, illustrative embodiments of which will now be described with reference to FIGS. 2 to 4.

The carrying structure of the first part 11 may be a conventional mechanical structure constituted by machined or molded supports 22. By virtue of the insulating material, a layer 23 of which is placed on the face of the supports 22 which is situated towards the ambient environment, the temperature of the supports is limited To the extent that this does not exceed 150° C., complete freedom is left in the selection of the metal materials in which the supports are constructed.

It is also possible to contemplate the construction of the carrying structure in an assembly having a honeycomb core, possibly covered with fabric, for example of high modulus (HM) carbon, in order to increase the rigidity. This assembly exhibits the advantage of being very light, while having a very large moment of inertia. It is, in particular, marketed by Aerospatiale under the trade mark NIDA ®.

Figure 2:
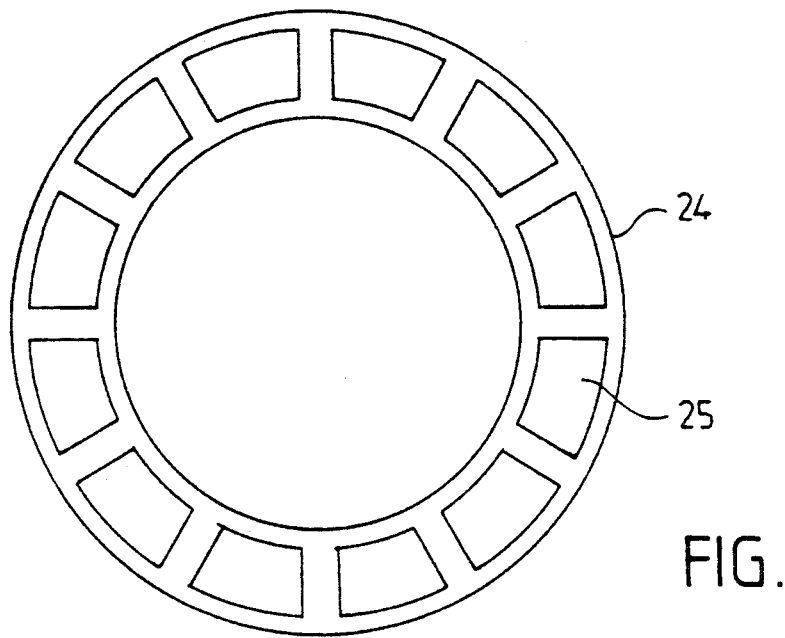
FIG. 2 represents a plan view of an example of a carrying structure for the protection device according to the invention.

Thus, FIG. 2 illustrates an example of a carrying structure constructed of NIDA ®. This structure is constructed from a solid cone of NIDA ® may be machined in such a manner as to construct openings. The benefit of the openings will be detailed hereinbelow in the description. It is then presented in the form of a conical plate 24 equipped with relatively large openings 25. This plate may be constructed in two parts, from two half-cones, in order to facilitate its mounting about the nozzle 3.

The plate 24 is likewise covered with a layer of thermally insulating material 23 on its face situated towards the ambient environment.

A plurality of types of insulating material may be used to cover the carrying structure of the first part 11 of the protection device according to the invention.

Having regard to what has been stated hereinabove, pressure-permeable materials are selected, in order to reduce the stresses exerted on the carrying structures and the elements which support them (frame).

The carrying structures described previously comprise recesses: openings 25 in the plate 24 for a carrying structure constructed of NIDA ® or spaces between the machined or molded supports 22 for a mechanical carrying structure.

Thus, if use is made of a pressure-permeable insulating material, the first part 11 of the protection device is pressure-permeable.

It is possible to cite as a pressure-permeable insulating material the material obtained by the method described in the patent FR-2,489,812 which has already been cited in the introduction of the present application and incorporated herein by way of reference.

This material exhibits a very high percentage of open pores, in the order of 84%, and a low percentage of fibers, in the order of 10%. It offers a resistance to sudden variations of pressure and a heat protection which are entirely satisfactory.

However, it is relatively fragile in relation to mechanical stresses and shocks, and can therefore be used only in association with carrying structures.

The material is manufactured, for this application, in the form of plates, the thickness of which is adapted to the conditions of use.

These plates are either adhesively bonded onto the carrying structures or fixed mechanically; it is then necessary to protect the fixing heads.

It is also possible to contemplate the integration, at the instant of the manufacture of the insulating material and more particularly at the instant of the suction of the fibers, of an implant in the form of a frame member and equipped with fixing tabs permitting the linking of the carrying structure to the insulating material. It is understood that, in this case, the implants are linked by adhesion to the fibers of the insulating material.

The invention is not limited to the use of this particular insulating material.

The second part 12 is constructed of a material which is not only a good heat insulator, permeable to gases, but which is also flexible. Examples of such a material will be detailed in the following part of the description.

The width of the second part 12 is selected in such a manner as to permit the deformations or displacements of the nozzle 3, especially deformations due to thermal expansions and angular displacements, as illustrated in FIG. 1, or in translation in relation to the skirt in the case of nozzles which are at least partially unfoldable or which comprise a divergent section which is at least partially unfoldable.

Figure 4:
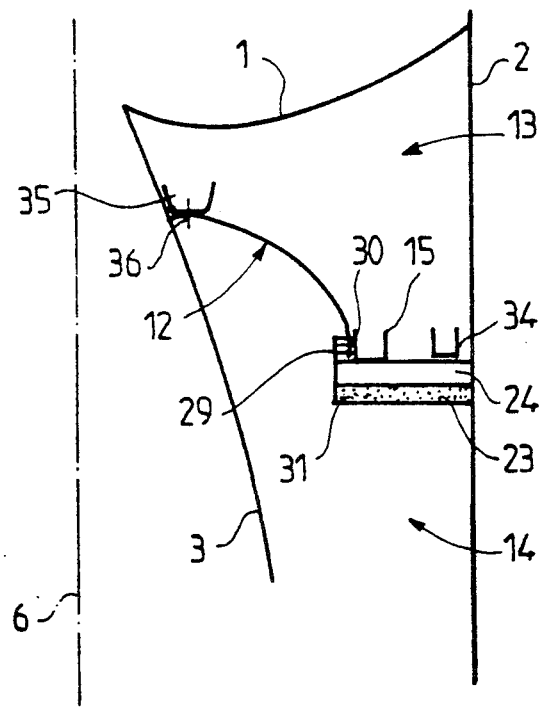
FIG. 4 represents a partial view, in cross section according to a plane passing through the axis of the rocket, of a second illustrative embodiment of the protection device according to the invention.

It is understood that, with regard to the angular displacements of the nozzle, the width of the second part 12 may be the smaller, the closer it is to the case 1 of the propulsion unit. The arrangement illustrated in FIGS. 1 and 4 is therefore preferable from the point of view of the mass of the protection device.

Figure 3:
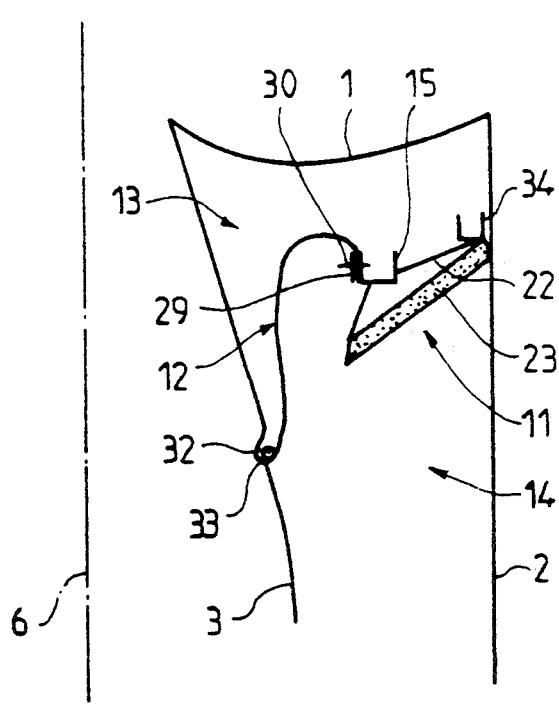
FIG. 3 represents a partial view in cross section according to a plane passing through the axis of the rocket, of a first illustrative embodiment of the protection device according to the invention.

Consideration may, however, be given to the idea of placing the first part 11 of the protection device closer to the case 1 of the propulsion unit than the internal periphery of the second part 12, by which this second part is fixed to the nozzle 3, as illustrated in FIG. 3.

It is possible to contemplate a plurality of types of materials to construct the second part of the device.

Figure 5:
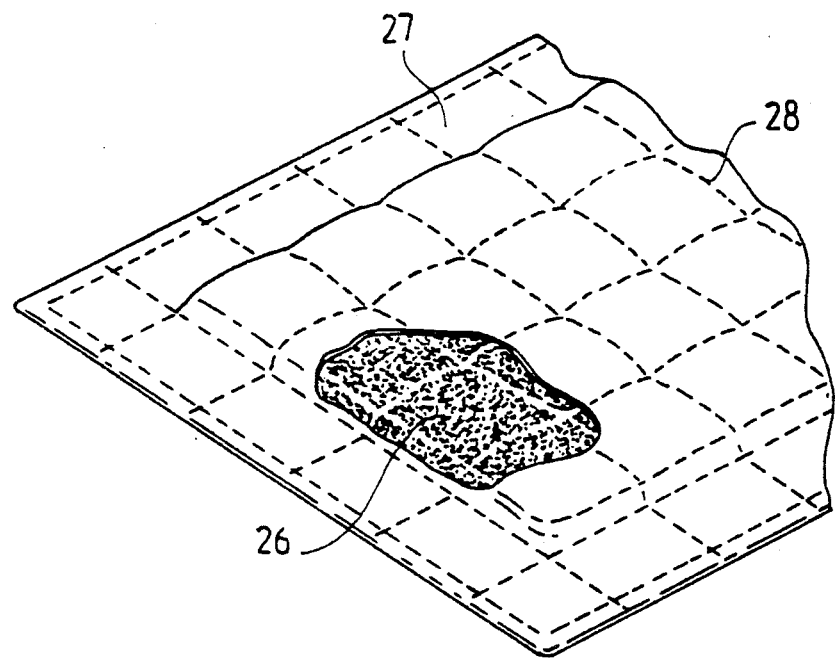
FIG. 5 represents a view, with a partial cross section, of the insulating material for the protection device according to the invention.

However, the material which will now be described with reference to FIG. 5 has been specially designed for this purpose and complies in an entirely satisfactory manner with the essential requirements set forth hereinabove.

This material is constituted essentially of three elements: a thermally insulating felt 26, a flame-retardant and refractory fabric 27 and possibly a refractory linkage wire.

The insulating felt 26 exhibits the advantage of being flexible and gas-permeable.

The fabric 27 is itself also flexible and gas-permeable, with a satisfactory mechanical stability. It is further possible to select a fabric constituted of fibers identical with those participating in the composition of the felt 26.

The material preferably comprises a layer of felt 26 between two layers of fabric 27. The latter layers permit the retention of the felt 26 and thus the imparting, to the whole, of a mechanical stability compatible with the levels of stresses encountered in the course of use.

It is, of course, possible to use more than two layers of fabric, but it is necessary to provide at least one layer of fabric on either side of the felt 26.

It may be noted that the layers of fabric 27, which are situated on either side of the felt 26, may or may not be of an identical nature and that they may or may not be constituted of fibers identical with those of the felt 26.

The layers of fabric and of felt may be simply juxtaposed or alternatively retained in position by any appropriate linkage means such as, for example, staples, back stitches, or alternatively stitches disposed along at least one direction determined in such a manner as to obtain a cushioning. These linkage means, such as the sewing 28, may in particular be disposed along perpendicular directions, as illustrated in FIG. 5.

These means, such as the sewings 28, ensure the cohesion between the various layers. In view of the fact that they divide the felt into compartments, they limit the effect of the vibrations.

Having regard to the high temperature of the gases emanating from a nozzle, use is preferably made of ceramic felts, comprising fibers of aluminum oxide, ($Al_2O_3$) and of aluminosilicate ($SiO_2$) or fibers of zirconium oxide ($Z_r O_2$), such as those marketed under the names Cerachem by the company John Manville France and under the names Kerlane 60 or Zirlane by the company Kerlane. It is found, after thermal tests, that these felts retain a flexibility which is sufficient to withstand the movements of the nozzle in the course of the operation of the propulsion unit.

Likewise, a selection is preferably made of fabrics constituted principally of wires, fibers or filaments of aluminum oxide ($Al_2O_3$) and of aluminosilicate ($SiO_2$), such as those marketed under the name Nextel by the company 3M, at least on the "hot face" of the insulating material, that is to say that face of the insulating material which is placed towards the second zone 14.

It is possible to use, on the "cold face" of the insulating material, that face which is placed towards the first zone 13, fabrics of aramid fiber such as those marketed under the name Kevlar, or alternatively carbon fabrics or fabrics composed of metal wires.

As regards the wires used to construct the sewings 28, it is possible to contemplate the use of Nextel wires.

It is also possible to contemplate the use, to construct the second part of the device, of a material constituted of a flexible metal lattice or fabric covered with refractory fabrics or fibers, for example a glass fabric. Such a material exhibits the advantage, in relation to that which has just been described, of being less fragile, in particular when the felt used in the preceding material is a ceramic felt. It is, however, less pressure-permeable than the preceding material.

A more precise description will now be given of non-limiting examples of embodiments linkage of the second part 12 of the device onto the nozzle 3, as well as examples of linkage of the two parts onto the lower frame member 15 of the frame 34.

The linkage between the first and the second part 11 and 12 is effected near the lower frame member 15 and in a conventional manner, for example by pinching one end of the second part 12 between the lower frame member 15 and a fixing element 29 and by fixing them by any appropriate means, for example screws 30. The element 29 is preferably covered with a layer of insulating material.

The linkage between the second part 12 and the nozzle 3 may be constructed via a cable 32 passing within the other end of the second part 12, this cable 32 being received within a throat 33 formed in the nozzle 3. This arrangement is illustrated in FIG. 3. It may likewise be constructed by means of a fixing system 35 placed on the nozzle 3, to which fixing system the other end of the second part 12 is fixed via any appropriate means, in particular screws 36. This arrangement is illustrated in FIG. 4.

The heat protection device which has just been described is composed of a screen in two parts, both ensuring a heat protection of the first zone 13 as well as a balancing of the pressures on either side of the protection device, the first part 11 being relatively rigid and the second part 12 relatively flexible. The second part 12 furthermore permits the movement of the nozzle.

Figure 6:
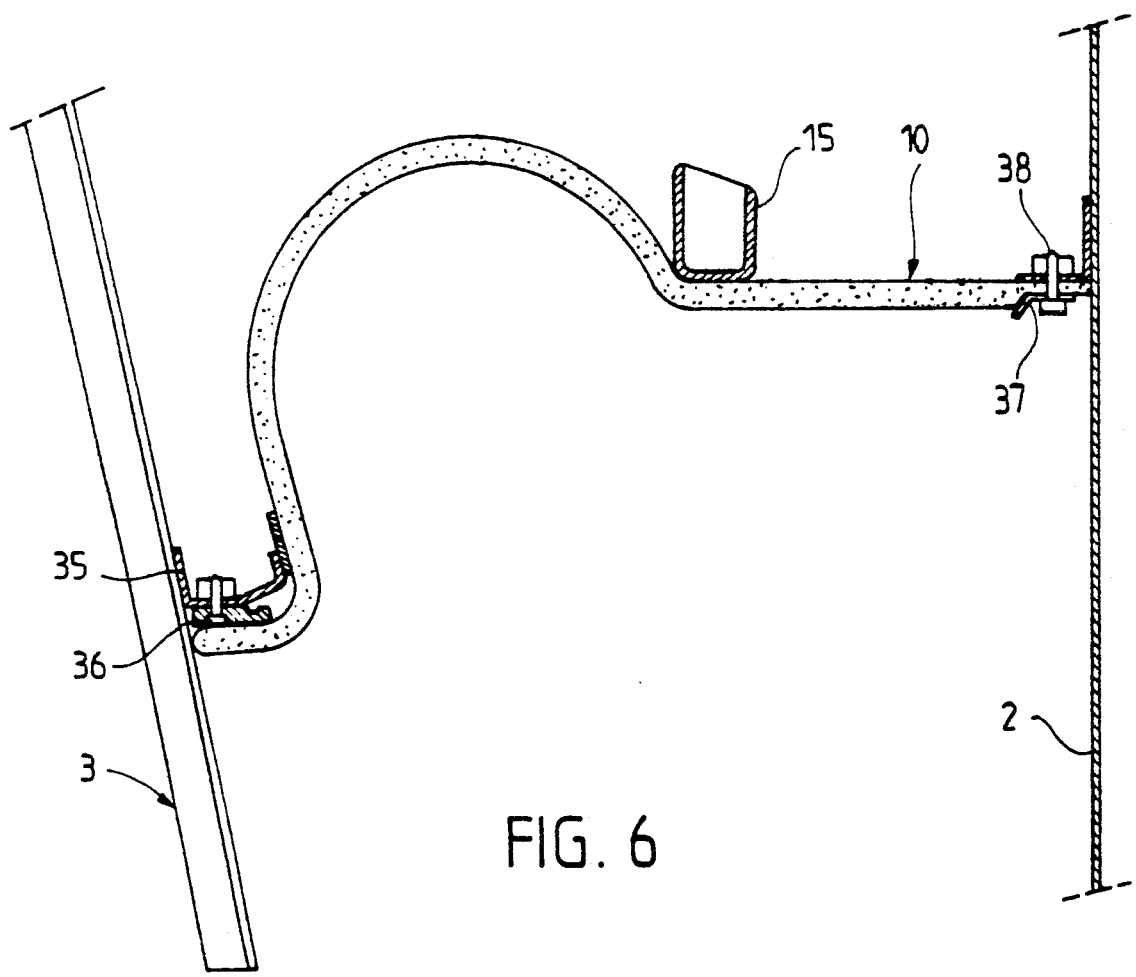
FIG. 6 represents a third illustrative embodiment of the protection device according to the invention and FIG. 7 represents a partial view, in cross section according to a plane passing through the axis of the rocket, of a fourth illustrative embodiment of the protection device according to the invention.

As illustrated in FIG. 6, it is possible to contemplate the elimination of the relatively rigid first part 11, the protection device according to the invention then being entirely constituted of a screen 10 of a flexible material, for example that which has been described with reference to FIG. 6.

The linkage between the protection device and the nozzle 3 is constructed, as previously, via a cable or a fixing system. It is the latter example which is illustrated in FIG. 6.

The protection device is fixed on the skirt 2, for example via a fixing element 37 connected to the skirt 2, fixing means such as screws 38 being provided to connect the device to the element 37, which is preferably covered with insulating material.

It is likewise fixed near the lower frame member 15 of the frame by any appropriate means.

It is understood that this device exhibits the same advantages as that described previously: heat protection, gas permeability and flexibility, while still permitting a significant gain in terms of mass. In fact, the rigid part of the device and especially its carrying structure is eliminated. It likewise permits the reduction of the number of parts participating in the construction of the device.

Figure 7:
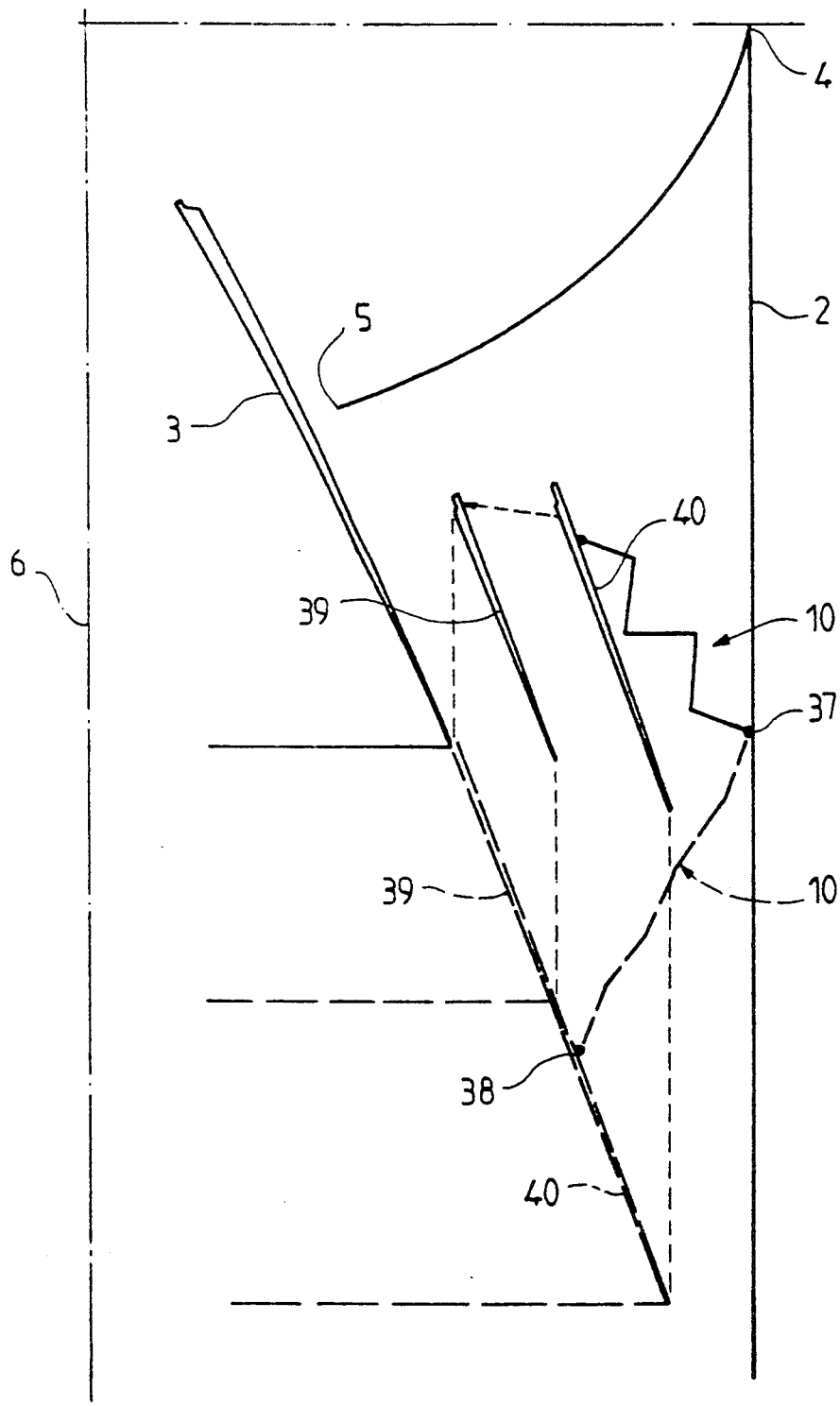

In the illustrative embodiment illustrated in FIG. 7, the protection device according to the invention is, as in FIG. 6, entirely constituted of a screen 10 constructed of a flexible material. It is fixed on the skirt 2 by appropriate fixing means 37 and on the nozzle 3 by appropriate means 38.

In this example, the divergent section of the nozzle 3 comprises two rings 39 and 40 which are articulated to one another and to the nozzle body.

In the unfolded position, shown in broken lines, the rings and the nozzle body are aligned one behind the other according to the profile desired for the divergent section in the active configuration. In its position corresponding to the unfolded position of the divergent section, the protection device 10 is likewise shown in broken lines in FIG. 7.

In the folded position of the divergent section, which position is shown in solid lines, the rings 39 and 40 are juxtaposed one about the other and about the nozzle body according to an accordion profile. The corresponding position of the protection device 10 is likewise shown in solid lines in FIG. 7.

This figure illustrates another essential advantage of the device according to the invention, which is its storage capacity. The latter permits the use of the device with a nozzle comprising a divergent section which is at least partially unfoldable.

It may be noted that the device may, in order to facilitate its mounting, be constructed in two annular parts. These two parts may then be connected by various means, in particular a lacing through eyelets, hooks, zip fasteners or alternatively self-spreading tapes.

What is claimed is:

1. A heat protection device between a first and a second zone, the second zone being subjected to relatively sudden and large variations of temperature and pressure, said device comprising: a screen disposed between the two zones, wherein said screen comprises means of thermally insulating said two zones, at least a part of said screen being constructed of a material which is pressure-permeable and flexible, said two zones being situated between at least one first and at least one second element of a rocket or missile, said at least one first element being constituted by a portion of the rocket or missile, said at least one second element being constituted by the skirt of the rocket or missile.

2. The device as claimed in claim 1, said elements being substantially opposite and capable of moving away from one another and of sliding in relation to one another, said screen exhibits at least one point of fastening on each one of said elements.

3. The device as claimed in claim 2, wherein said screen exhibits a form which can be fastened on the first and second elements.

4. The device as claimed in one of claims 1 to 3, wherein said second zone is subjected to temperature and pressure of gases emanating from a generator of relatively hot gases.

5. The device as claimed in claim 4, wherein said at least one first element is constituted by said hot-gas generator.

6. The heat protection device as claimed in claim 4, wherein said two zones are situated to the rear of a propulsion unit of the rocket or of a missile.

7. The heat protection device as claimed in claim 6, wherein said hot-gas generator is constituted by the propulsion unit and nozzle of the rocket or missile.

8. The heat protection device as claimed in claim 7, wherein said part of said screen constructed of flexible material is fixed on the nozzle near an internal periphery.

9. The heat protection device as claimed in 6, wherein said first zone is further situated between a case of the propulsion unit and the screen.

10. The heat protection device as claimed in claim 6, wherein said second zone is further situated between the screen and an ambient environment.

11. The heat protection device as claimed in claim 1, wherein said screen is substantially annular, an external periphery constituting a zone of fastening on the skirt, while an internal periphery constitutes a zone of fastening on a nozzle.

12. The heat protection device as claimed in claim 1, wherein said screen further comprises another part, an external periphery of which is fixed on the skirt.

13. The heat protection device as claimed in claim 12, wherein said another part is constituted of a thermally insulating and rigid material.

14. The heat protection device as claimed in claim 12, wherein said another part is constituted of a thermally insulating material and of a carrying structure.

15. The heat protection device as claimed claim 14, wherein said thermally insulating material is pressure-permeable.

16. The heat protection device as claimed in claim 14, wherein the carrying structure is supported by a frame.

17. The heat protection device as claimed in claim 16, wherein said frame is composed of arms distributed about a nozzle and connected to one another via an upper frame member and a lower frame member, the upper frame member being fixed to the skirt, while the lower frame member supports the carrying structure.

18. The heat protection device as claimed in claim 17, wherein said part of said screen constructed of flexible material is fixed to the lower frame member near an external periphery.

19. The heat protection device as claimed in claim 14, wherein the carrying structure is constituted by machined or molded supports.

20. The heat protection device as claimed in claim 14, wherein the carrying structure is constituted by a honeycomb conical plate.

21. The heat protection device as claimed in claim 20, wherein said honeycomb conical plate comprises openings.

22. The heat protection device as claimed in claim 1, wherein said part of said screen constructed of flexible material constitutes the entire screen and is fixed near an external periphery on the skirt.

23. The heat protection device as claimed in claim 22, wherein said part of said screen constructed of flexible material is likewise fixed on a lower frame member of a frame.

24. The heat protection device as claimed in claim 22, wherein the screen is composed of two annular elements which are connected to one another during mounting.

* * * * *